United States Patent
Lin

(10) Patent No.: US 8,449,770 B2
(45) Date of Patent: May 28, 2013

(54) MULTI-PURPOSE FILTER CARTRIDGE ASSEMBLY

(76) Inventor: Ying-Chen Lin, Hsinchu (TW)

( * ) Notice: Subject to any disclaimer, the term of this patent is extended or adjusted under 35 U.S.C. 154(b) by 83 days.

(21) Appl. No.: 13/222,294

(22) Filed: Aug. 31, 2011

(65) Prior Publication Data

US 2012/0145622 A1 Jun. 14, 2012

(30) Foreign Application Priority Data

Sep. 2, 2010 (CN) ...................... 2010 2 0515333 U

(51) Int. Cl.
*B01D 29/50* (2006.01)
*B01D 29/52* (2006.01)
*B01D 29/56* (2006.01)

(52) U.S. Cl.
USPC ....................................... 210/232; 210/323.2

(58) Field of Classification Search
USPC ............................... 210/232, 323.2
See application file for complete search history.

(56) References Cited

U.S. PATENT DOCUMENTS

| | | | | |
|---|---|---|---|---|
| 4,944,875 | A | * | 7/1990 | Gaignet ......................... 210/232 |
| 5,002,664 | A | * | 3/1991 | Clack et al. .................... 210/251 |
| 5,143,601 | A | * | 9/1992 | Slovak et al. ................... 210/90 |
| 5,407,571 | A | * | 4/1995 | Rothwell ....................... 210/232 |

FOREIGN PATENT DOCUMENTS

WO WO 2006/115352 A1 * 11/2006

* cited by examiner

*Primary Examiner* — Thomas M Lithgow
(74) *Attorney, Agent, or Firm* — patenttm.us

(57) ABSTRACT

A multi-purpose water filter cartridge assembly has two sets of manifold holes formed in a top of a manifold integration board. Each set of manifold holes is composed of an inlet, a first outlet and a second outlet. The first outlet of the first set of manifold holes communicates with the inlet of the second set of manifold holes. The manifold integration board further has four sets of cartridge connection holes formed in a bottom thereof and each set is composed of a first inlet, a second inlet and an outlet. The first and second inlets of two sets of the four sets of cartridge connection holes respectively communicate with the first and second outlets of the first set of manifold holes. The inlets of the two sets of cartridge connection holes respectively communicate with the outlets of the first set of manifold holes. The first and second inlets of the other two sets of cartridge connection holes respectively communicate with the first and second outlets of the second set of manifold holes, and the inlets of the two sets of cartridge connection holes respectively communicate with the outlets of the second set of manifold holes through connection holes inside the manifold integration board. At least one filter cartridge is mounted on a bottom of the manifold integration board. The present invention can conveniently and accurately connect multiple filter cartridges in serial, in parallel or both.

6 Claims, 6 Drawing Sheets

MULTI-PURPOSE FILTER CARTRIDGE ASSEMBLY

BACKGROUND OF THE INVENTION

1. Field of the Invention

The present invention relates to a part of a water filter, and more particularly to a multi-purpose water filter cartridge assembly.

2. Description of the Related Art

It is well known that a water filter has many filter cartridges. These filter cartridges are mutually independent entities, and their types may be identical or different. To comprehensively process raw water entering a water filter, all filter cartridges are serially connected. To increase processed amount of raw water, all filter cartridges are parallelly connected. To consider both processing effect and processed amount of raw water, all filter cartridges are serially and parallelly connected. To fulfill the foregoing connection patterns, all filter cartridges are sequentially connected by using soft tubes respectively connected between inlets and outlets of the filter cartridges. As all filter cartridges are consumable goods and have roughly the same life cycle, filter cartridges must be totally replaced after being used for a period of time. The soft tubes are respectively disconnected from the inlets and the outlets of the filter cartridges upon replacement of the filter cartridges. The soft tubes must be connected again in accordance with the sequence of the new filter cartridges. The entire replacement processes are inconvenient, complicated and time and effort consuming, and worsen working efficiency. The soft tubes are prone to wrong connection. Besides, due to lengthy soft tubes, the water filter is costly, and a high likelihood of leakage may arise from a multitude of adapters.

SUMMARY OF THE INVENTION

An objective of the present invention is to provide a multi-purpose water filter cartridge assembly to conveniently and accurately connect multiple filter cartridges in serial, in parallel or both.

To achieve the foregoing objective, the multi-purpose water filter cartridge assembly has a manifold integration board and at least one filter cartridge. The manifold integration board has a first set of manifold holes, a second set of manifold holes and four sets of cartridge connection holes.

The first set of manifold holes and the second set of manifold holes are formed in a top of the manifold integration board. Each one of the first and second sets of manifold holes is composed of an inlet, a first outlet and a second outlet. The first outlet of the first set of manifold holes communicates with the inlet of the second set of manifold holes through a connection hole formed inside the manifold integration board.

Each set of cartridge connection holes is composed of an outlet, a first inlet and a second inlet. The first inlets and the second inlets of two sets of the four sets of cartridge connection holes respectively communicate with the first outlet and the second outlet of the first set of manifold holes and the inlets of the two sets of cartridge connection holes communicate with the outlet of the first set of manifold holes through connection holes inside the manifold integration board. The first inlets and the second inlets of the other two sets of manifold connection holes respectively communicate with the first outlet and the second outlet of the second set of manifold holes and the inlets of the two sets of cartridge connection holes communicate with the outlet of the second set of manifold holes through connection holes formed inside the manifold integration board.

The at least one filter cartridge is mounted in a bottom of the manifold integration board. Each one of the at least one filter cartridge has an inlet nozzle, a first outlet nozzle and a second outlet nozzle respectively inserted in the first inlet, the second inlet and the outlet of a corresponding set of cartridge connection holes.

With the foregoing technical solution, the inlet nozzle and outlet nozzles of each filter cartridge are all formed on a top of the filter cartridge, and the manifold integration board is not subjected to changes. By varying the number and position of the filter cartridges inserted in manifold integration board, the filter cartridges can be implemented to be serially connected, parallelly connected or both to achieve different processing objectives. After the filter cartridges are used for a period of time, the life cycles thereof expire and the filtering effect significantly downgrades. All we need to do is to replace the entire water filter cartridge assembly of the present invention without sequentially replacing the filter cartridges one by one. In contrast to conventional water filters, the present invention realizes the assembly of inlet and outlets of filter cartridges and manifolds and easily and accurately implements serial connection, parallel connection or both of the filter cartridges to achieve different processing objectives, and easy, fast and time and effort saving assembly and disassembly to significantly improve working efficiency. Additionally, the present invention removes all soft tubes connected to the filter cartridges to lower the production cost and greatly reduce the likelihood of leakage between filter cartridges.

For optimization the manifold integration board is square, the first set of manifold holes is formed in a left portion of the manifold integration board, a second set of manifold holes is formed in a right portion of the manifold integration board, and the first and second sets of manifold holes are juxtaposed from the left to the right, the inlet, the first outlet and the second outlet of each one of the first and second sets of manifold holes are aligned in a row from the left to the right. The four sets of cartridge connection holes are respectively distributed on a left front portion, a left rear portion, a right front portion and a right rear portion of the manifold integration board, and the outlet, the first inlet and the second inlet of each set of cartridge connection holes are aligned in rows from the left to the right.

As a first embodiment of the present invention, two filter cartridges are mounted on a bottom of the manifold integration board, and the inlet nozzles, the first outlet nozzles and the second outlet nozzles on tops of the two filter cartridges are respectively inserted in the two sets of cartridge connection holes on the left front portion and the left rear portion of the manifold integration board. Accordingly, the two filter cartridges can be parallelly connected to jointly process raw water and achieve a simple and convenient operation.

As a second embodiment of the present invention, two filter cartridges are mounted on a bottom of the manifold integration board, and the inlet nozzles, and the first outlet nozzles and the second outlet nozzles on tops of the two filter cartridges are respectively inserted in the two sets of cartridge connection holes on the left front portion and the right front portion of the manifold integration board. Accordingly, the two filter cartridges can be serially connected to jointly process raw water and achieve a simple and convenient operation.

As a third embodiment of the present invention, three filter cartridges are mounted on a bottom of the manifold integration board, and the inlet nozzles, the first outlet nozzles and the second outlet nozzles on tops of the three filter cartridges are respectively inserted in the three sets of cartridge connection holes on the left front portion, the left rear portion, and the right front portion of the manifold integration board. Accordingly, after being parallelly connected, the two filter cartridges on the left front and left rear of the manifold integration board are further serially connected with the filter cartridge on the right front of the manifold integration board. Accordingly, such arrangement of the three filter cartridges ensures processing effect of raw water, increases processing amount of raw water, achieves a simple and convenient operation, and easily and accurately implements a combined connection means as required.

As a fourth embodiment of the present invention, four filter cartridges are mounted on a bottom of the manifold integration board, and the inlet nozzles, the first outlet nozzles and the second outlet nozzles on tops of the four filter cartridges are respectively inserted in the four sets of cartridge connection holes of the manifold integration board. Such arrangement of filter cartridges lets the filter cartridges on the left and on the right of the manifold integration board be first parallelly connected and then serially connected. Accordingly, the present embodiment has better processing effect and larger amount of raw water, achieves a simple and convenient operation, and easily and accurately implements a combined connection means as required.

Beneficial effects: The present invention is structurally simple and ingeniously conceived such that multiple filter cartridges can be conveniently and accurately connected in serial, in parallel or both to achieve simple assembly and disassembly and fast, time and effort saving and efficient operation.

DETAILED DESCRIPTION OF THE INVENTION

Figure 1:
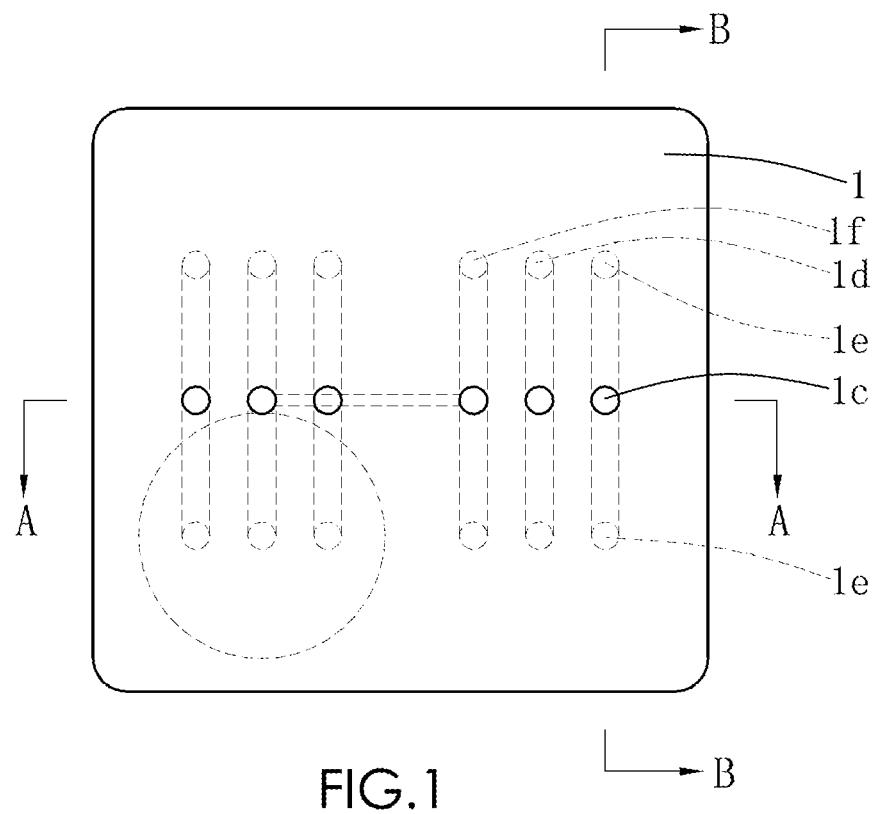
FIG. 1 is a schematic view of a first embodiment of a multi-purpose filter cartridge assembly in accordance with the present invention.
Figure 2:
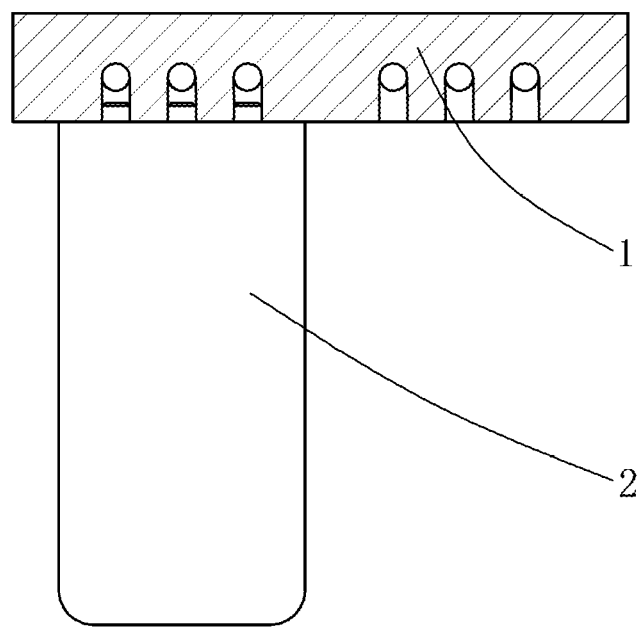
FIG. 2 is a front view of the multi-purpose filter cartridge assembly in FIG. 1.
Figure 3:
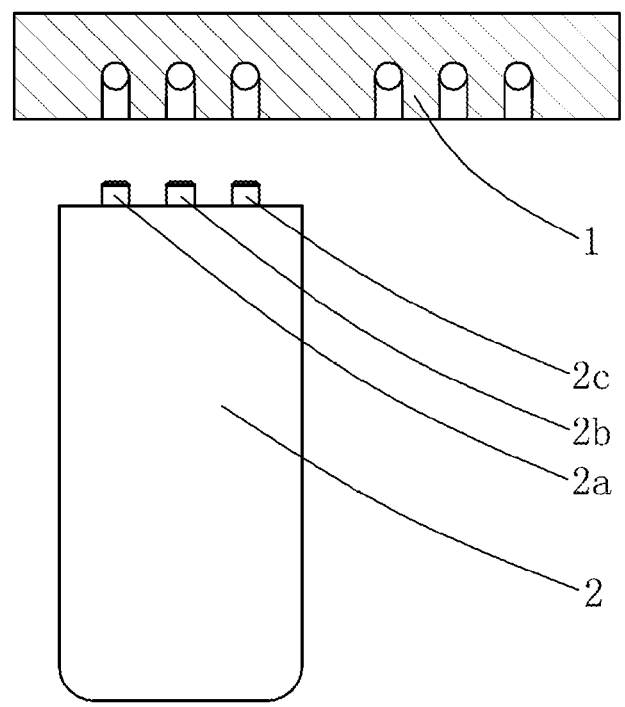
FIG. 3 is an exploded view of the multi-purpose filter cartridge assembly in FIG. 2.
Figure 4:
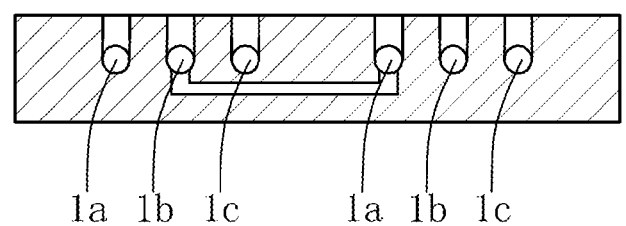
FIG. 4 is a cross-sectional view of a manifold integration board taken along a line A-A in FIG. 1.
Figure 5:
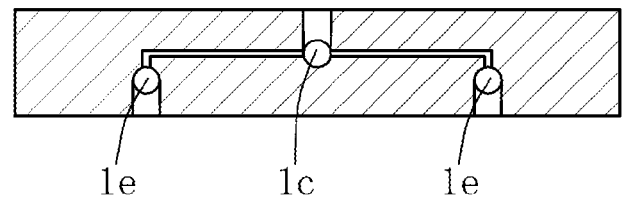
FIG. 5 is a cross-sectional view of the manifold integration board taken along a line B-B in FIG. 1.

Embodiment 1:

With reference to FIGS. 1 to 5, a first embodiment of a multi-purpose water filter cartridge assembly in accordance with the present invention has a manifold integration board 1. The manifold integration board 1 is square and has two manifold hole sets formed in a top thereof. A first set of manifold holes is formed in a left portion of the manifold integration board 1, and a second set of manifold holes is formed in a right portion of the manifold integration board 1. The first and second sets of manifold holes are juxtaposed from the left to the right. Each one of the first and second sets of manifold holes is composed of an inlet 1$a$, a first outlet 1$b$ and a second outlet 1$c$, which are aligned in a row from the left to the right. The first outlet 1$b$ of the first set of manifold holes communicates with the inlet 1$a$ of the second set of manifold holes through a connection hole inside the manifold integration board 1. The manifold integration board 1 further has four sets of cartridge connection holes. The four sets of cartridge connection holes are respectively distributed on a left front portion, a left rear portion, a right front portion and a right rear portion of the manifold integration board 1. Each set of cartridge connection holes is composed of an outlet 1$f$, a first inlet 1$d$ and a second inlet 1$e$. The outlet 1$f$, the first inlet 1$d$ and the second inlet 1$e$ of each set of cartridge connection holes are aligned in rows from the left to the right. The first inlets 1$d$ and the second inlets 1$e$ of the two sets of cartridge connection holes on the left respectively communicate with the first outlet 1$b$ and the second outlet 1$c$ of the first set of manifold holes and the inlets 1$a$ of the two sets of cartridge connection holes communicate with the outlet 1$f$ of the first set of manifold holes through connection holes inside the manifold integration board 1. The first inlets 1$d$ and the second inlets 1$e$ of the other two sets of manifold connection holes on the right respectively communicate with the first outlet 1$b$ and the second outlet 1$c$ of the second set of manifold holes and the inlets 1$a$ of the two sets of cartridge connection holes communicate with the outlet 1$f$ of the second set of manifold holes through connection holes formed inside the manifold integration board 1.

In the present embodiment, the multi-purpose water filter cartridge assembly further has at least one filter cartridge 2 perpendicularly mounted in a bottom of the manifold integration board 1. Each one of the at least one filter cartridge 2 has an inlet nozzle 2$a$, a first outlet nozzle 2$b$ and a second outlet nozzle 2$c$ formed on a top thereof. The first outlet nozzle 2$b$, the second outlet nozzle 2$c$ and the inlet nozzle 2$a$ of a filter cartridge 2 are respectively inserted in the first inlet 1$d$, the second inlet 1$e$ and the outlet 1$f$ of a corresponding set of cartridge connection holes. In the present embodiment, the number of the filter cartridges 2 is one, and the nozzles on the filter cartridge 2 are inserted in the set of cartridge connection holes on the left front portion of the manifold integration board 1.

Figure 6:
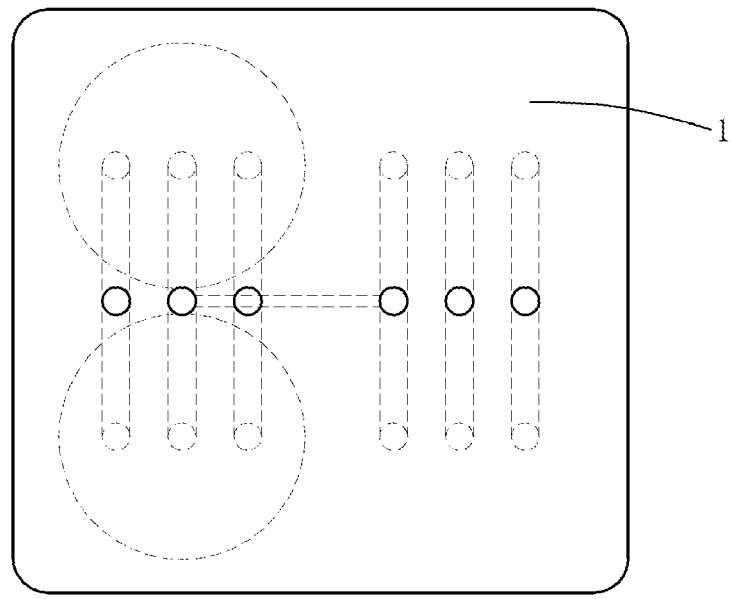
FIG. 6 is a schematic view of a second embodiment of a multi-purpose filter cartridge assembly in accordance with the present invention.
Figure 7:
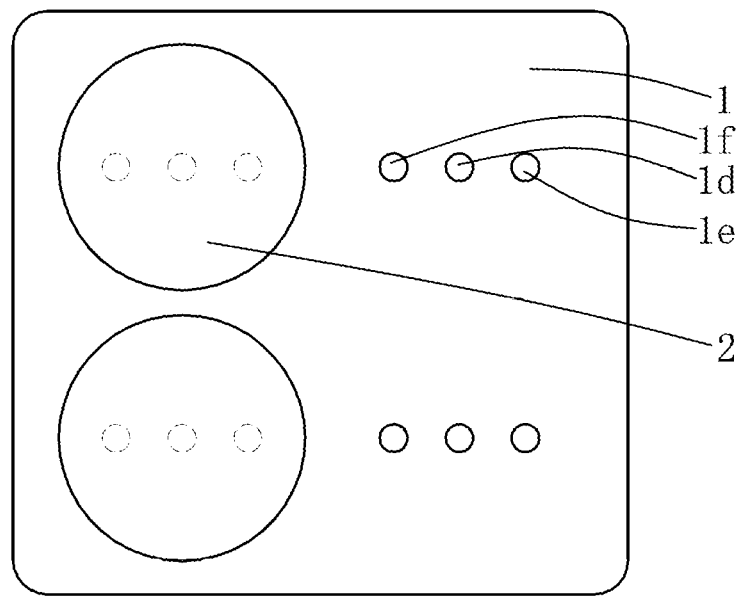
FIG. 7 is a bottom view of FIG. 6.

Embodiment 2:

With reference to FIGS. 6 and 7, a second embodiment of a multi-purpose water filter cartridge assembly in accordance with the present invention has two filter cartridges 2 mounted on a bottom of the manifold integration board 1. The nozzles on tops of the two filter cartridges 2 are respectively inserted in the two sets of cartridge connection holes on the left front portion and the left rear portion of the manifold integration board 1 so that the two filter cartridges 2 are parallelly connected. The rest of the structure of the present embodiment is identical to that of the first embodiment and is not repeatedly described here.

Figure 8:
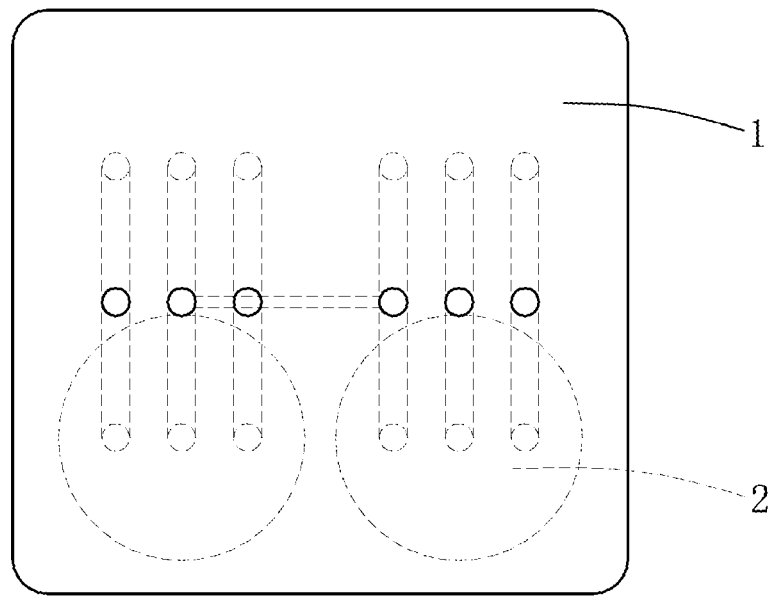
FIG. 8 is a schematic view of a third embodiment of a multi-purpose filter cartridge assembly in accordance with the present invention.
Figure 9:
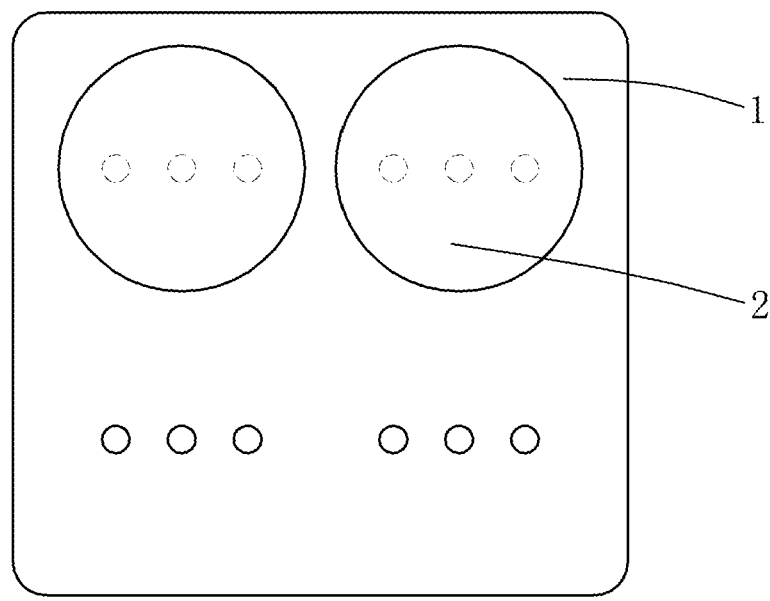
FIG. 9 is a bottom view of FIG. 8.

Embodiment 3:

With reference to FIGS. 8 and 9, a third embodiment of a multi-purpose water filter cartridge assembly in accordance with the present invention has two filter cartridges 2 mounted on a bottom of the manifold integration board 1. The nozzles on tops of the two filter cartridges 2 are respectively inserted in the two sets of cartridge connection holes on the left front portion and the right front portion of the manifold integration board 1 so that the two filter cartridges 2 are serially connected. The rest of the structure of the present embodiment is identical to that of the first embodiment and is not repeatedly described here.

Figure 10:
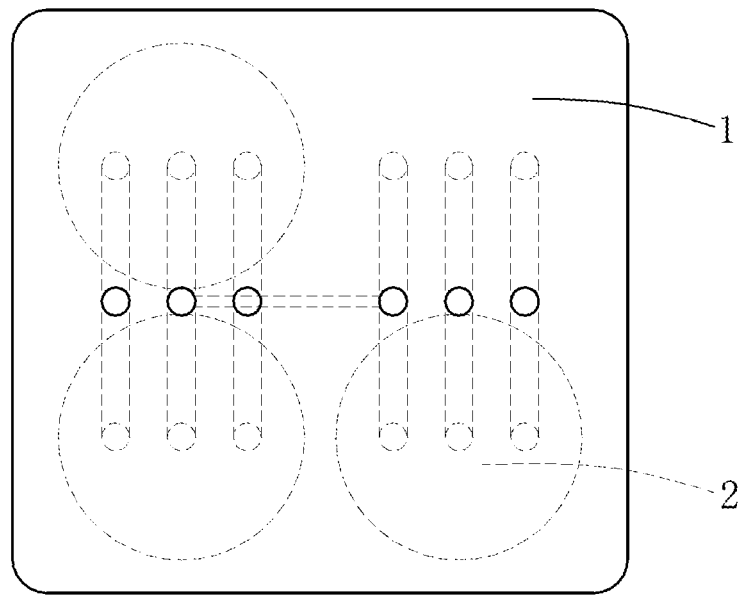
FIG. 10 is a schematic view of a fourth embodiment of a multi-purpose filter cartridge assembly in accordance with the present invention.
Figure 11:
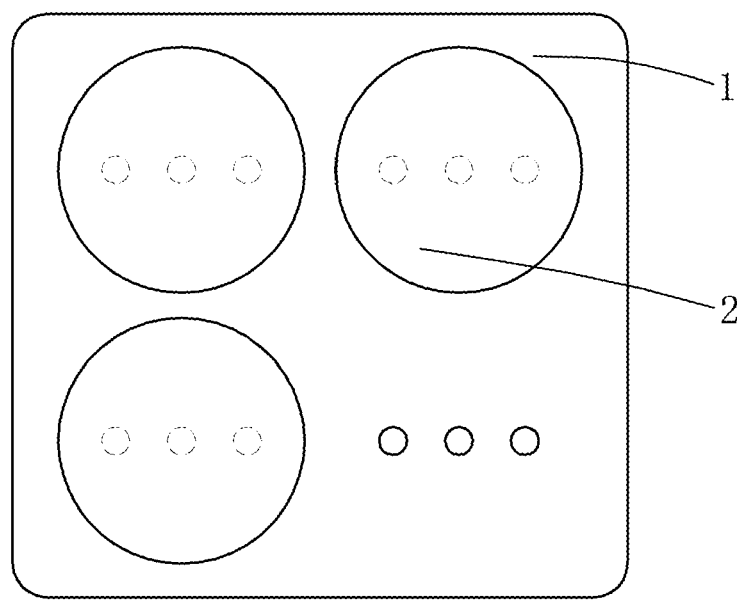
FIG. 11 is a bottom view of FIG. 10.

Embodiment 4:

With reference to FIGS. 10 and 11, a fourth embodiment of a multi-purpose water filter cartridge assembly in accordance with the present invention has three filter cartridges 2 mounted on a bottom of the manifold integration board 1. The nozzles on tops of the three filter cartridges 2 are respectively inserted in the three sets of cartridge connection holes on the left front portion, the left rear portion and the right front portion of the manifold integration board 1 so that the two filter cartridges 2 on the left of the manifold integration board 1 are parallelly connected and then are serially connected with the filter cartridge 2 on the right of the manifold integration board 1. The rest of the structure of the present embodiment is identical to that of the first embodiment and is not repeatedly described here.

Figure 12:
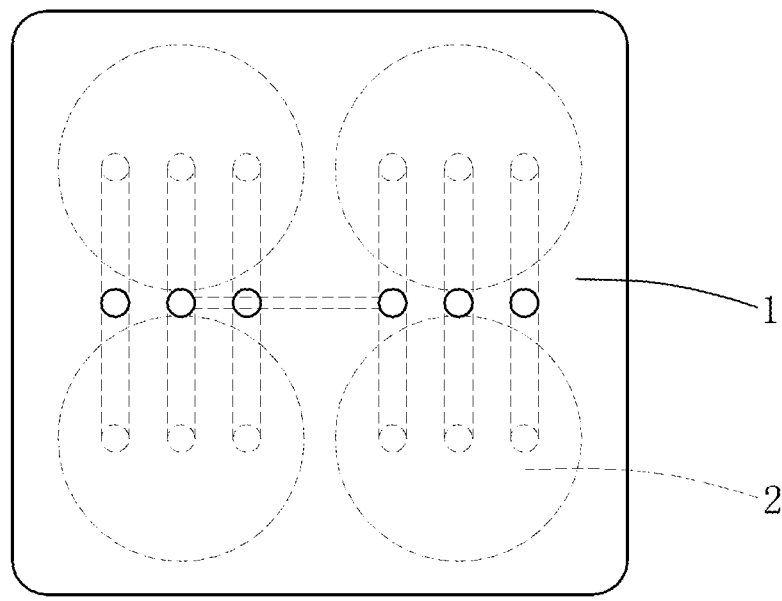
FIG. 12 is a schematic view of a fifth embodiment of a multi-purpose filter cartridge assembly in accordance with the present invention.
Figure 13:
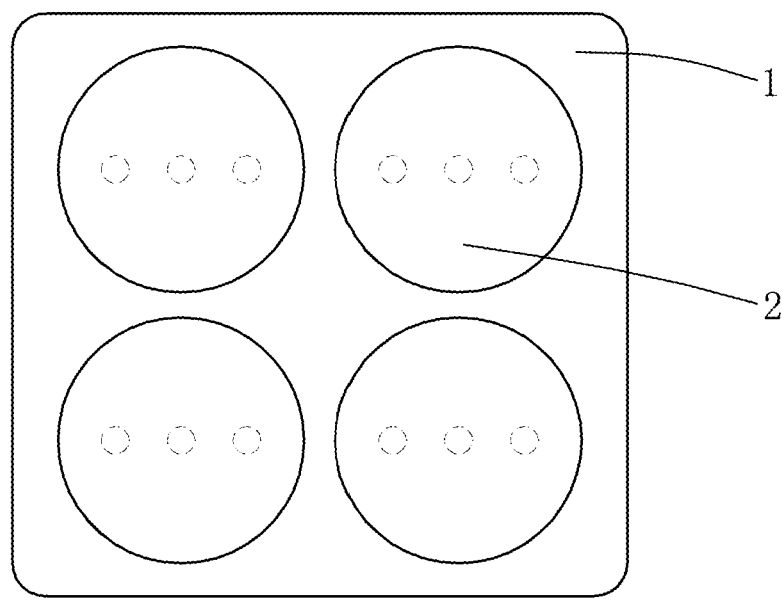
FIG. 13 is a bottom view of FIG. 12.

Embodiment 5:

With reference to FIGS. 12 and 13, a fifth embodiment of a multi-purpose water filter cartridge assembly in accordance with the present invention has four filter cartridges 2 mounted on a bottom of the manifold integration board 1. The nozzles on tops of the four filter cartridges 2 are respectively inserted in the four sets of cartridge connection holes on the manifold integration board 1 so that the two filter cartridges 2 on the left and the two filter cartridges on the right of the manifold integration board 1 are respectively connected in parallel and the two pairs of parallelly connected filter cartridges 2 are serially connected. The rest of the structure of the present embodiment is identical to that of the first embodiment and is not repeatedly described here.

With the foregoing technical solution, the inlet nozzle and the outlet nozzles are formed on the top of the filter cartridge 2 without making any change to the manifold integration board 1. By varying the number of the inserted filter cartridges 2 and the positions on which the filter cartridges 2 are mounted, the filter cartridges 2 can be serially connected, parallelly connected or both serially and parallelly connected to achieve various processing objectives. After being used for a period of time, the life cycle of the filter cartridges expires and the filtering effect is significantly downgraded. What we need to do is to replace the entire water filter cartridge assembly instead of replacing each filter cartridge one by one as conventionally. In contrast to conventional structure, the present invention realizes the integration of inlets and outlets of filter cartridges and water manifolds, and easily and accurately implements serial connection, parallel connection and both serial and parallel connection of the filter cartridges, thereby achieving different processing objectives in terms of easy, convenient and fast assembly and disassembly and significantly enhancing the working efficiency. As the soft tubes in connection with each filter cartridge are eliminated, the production cost is reduced and the likelihood of leakage among filter cartridges is dramatically lowered.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multi-purpose water filter cartridge assembly comprising:
   a manifold integration board having:
   a first set of manifold holes and a second set of manifold holes formed in a top of the manifold integration board, wherein each one of the first and second sets of manifold holes is composed of an inlet, a first outlet and a second outlet, the first outlet of the first set of manifold holes communicates with the inlet of the second set of manifold holes through a connection hole formed inside the manifold integration board;
   four sets of cartridge connection holes, each set of cartridge connection holes composed of an outlet, a first inlet and a second inlet, wherein the first inlets and the second inlets of two sets of the four sets of cartridge connection holes respectively communicate with the first outlet and the second outlet of the first set of manifold holes and the inlets of the two sets of cartridge connection holes communicate with the outlet of the first set of manifold holes through connection holes inside the manifold integration board, the first inlets and the second inlets of the other two sets of cartridge connection holes respectively communicate with the first outlet and the second outlet of the second set of manifold holes and the inlets of the other two sets of cartridge connection holes communicate with the outlet of the second set of manifold holes through connection holes formed inside the manifold integration board; and
   at least one filter cartridge mounted in a bottom of the manifold integration board, each one of the at least one filter cartridge having an inlet nozzle, a first outlet nozzle and a second outlet nozzle respectively inserted in the outlet, first inlet and second inlet of a corresponding set of cartridge connection holes.

2. The multi-purpose water filter cartridge assembly as claimed in claim 1, wherein
   the manifold integration board is square;
   the first set of manifold holes is formed in a left portion of the manifold integration board, a second set of manifold holes is formed in a right portion of the manifold integration board, and the first and second sets of manifold holes are juxtaposed from the left to the right;
   the inlet, the first outlet and the second outlet of each one of the first and second sets of manifold holes are aligned in a row from the left to the right;
   the four sets of cartridge connection holes are respectively distributed on a left front portion, a left rear portion, a right front portion and a right rear portion of the manifold integration board; and
   the outlet, the first inlet and the second inlet of each set of cartridge connection holes are aligned in rows from the left to the right.

3. The multi-purpose water filter cartridge assembly as claimed in claim 2, comprising two filter cartridges mounted on a bottom of the manifold integration board, wherein the inlet nozzles, and the first outlet nozzles and the second outlet nozzles on tops of the two filter cartridges are respectively inserted in the two sets of cartridge connection holes on the left front portion and the left rear portion of the manifold integration board.

4. The multi-purpose water filter cartridge assembly as claimed in claim 2, comprising two filter cartridges mounted on a bottom of the manifold integration board, wherein the inlet nozzles, the first outlet nozzles and the second outlet nozzles on tops of the two filter cartridges are respectively inserted in the two sets of cartridge connection holes on the left front portion and the right front portion of the manifold integration board.

5. The multi-purpose water filter cartridge assembly as claimed in claim 2, comprising three filter cartridges mounted on a bottom of the manifold integration board, wherein the inlet nozzles, the first outlet nozzles and the second outlet nozzles on tops of the three filter cartridges are respectively inserted in the three sets of cartridge connection holes on the left front portion, the left rear portion, and the right front portion of the manifold integration board.

6. The multi-purpose water filter cartridge assembly as claimed in claim 2, comprising four filter cartridges mounted on a bottom of the manifold integration board, wherein the inlet nozzles, the first outlet nozzles and the second outlet nozzles on tops of the four filter cartridges are respectively inserted in the four sets of cartridge connection holes of the manifold integration board.

* * * * *